United States Patent [19]

Estela Rosell

[11] Patent Number: 4,629,026
[45] Date of Patent: Dec. 16, 1986

[54] COMPACT ASSISTED STEERING MECHANISM FOR A MOTOR VEHICLE

[75] Inventor: Jorge Estela Rosell, Barcelona, Spain

[73] Assignee: Bendiberica, S.A., Barcelona, Spain

[21] Appl. No.: 668,438

[22] Filed: Nov. 5, 1984

[30] Foreign Application Priority Data

Nov. 18, 1983 [ES] Spain ............................ 527577

[51] Int. Cl.$^4$ ............................................. B62D 5/06
[52] U.S. Cl. ................................ 180/148; 91/216 R
[58] Field of Search ............... 180/148, 152, 154, 158, 180/151; 74/388 PS; 91/216 R, 216 A; 92/117 R, 117 A, 136

[56] References Cited

U.S. PATENT DOCUMENTS

| 1,960,379 | 5/1934 | Havens | 91/216 |
|---|---|---|---|
| 3,814,202 | 6/1974 | Rushton et al. | 92/136 |
| 3,930,436 | 1/1976 | Hedenbery | 91/216 A |
| 4,428,450 | 1/1984 | Stenstrom et al. | 180/148 |
| 4,479,400 | 10/1984 | Rieger | 180/148 |

FOREIGN PATENT DOCUMENTS 2730135  1/1978  Fed. Rep. of Germany ...... 180/148

Primary Examiner—John J. Love
Assistant Examiner—Mark C. Dukes
Attorney, Agent, or Firm—Larry J. Palguta; Ken C. Decker

[57] ABSTRACT

Situated between the opposite end walls (13, 13') of a fixed steering casing (10) is a hollow rod (14) carrying a fixed piston (16) on which a cylinder assembly (50, 51) slides, on which is elastically mounted, through the intermediary of elastic components (34), a rack block (30) meshing with a pinion (20) which is coupled to the output component of a distribution valve (40).

9 Claims, 7 Drawing Figures

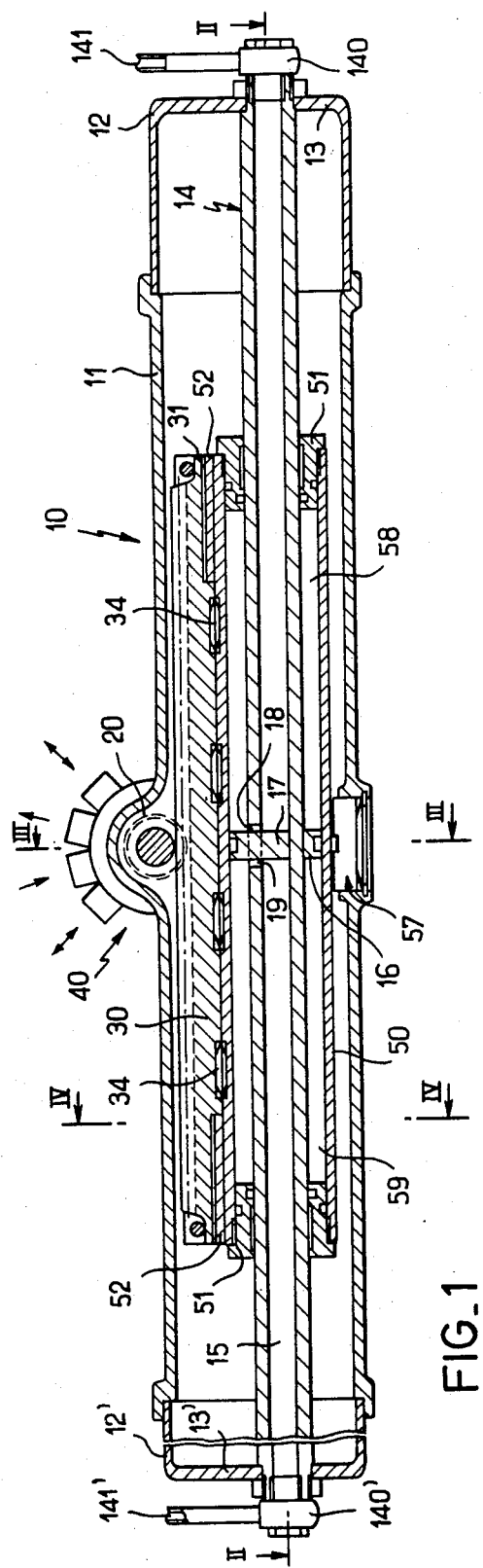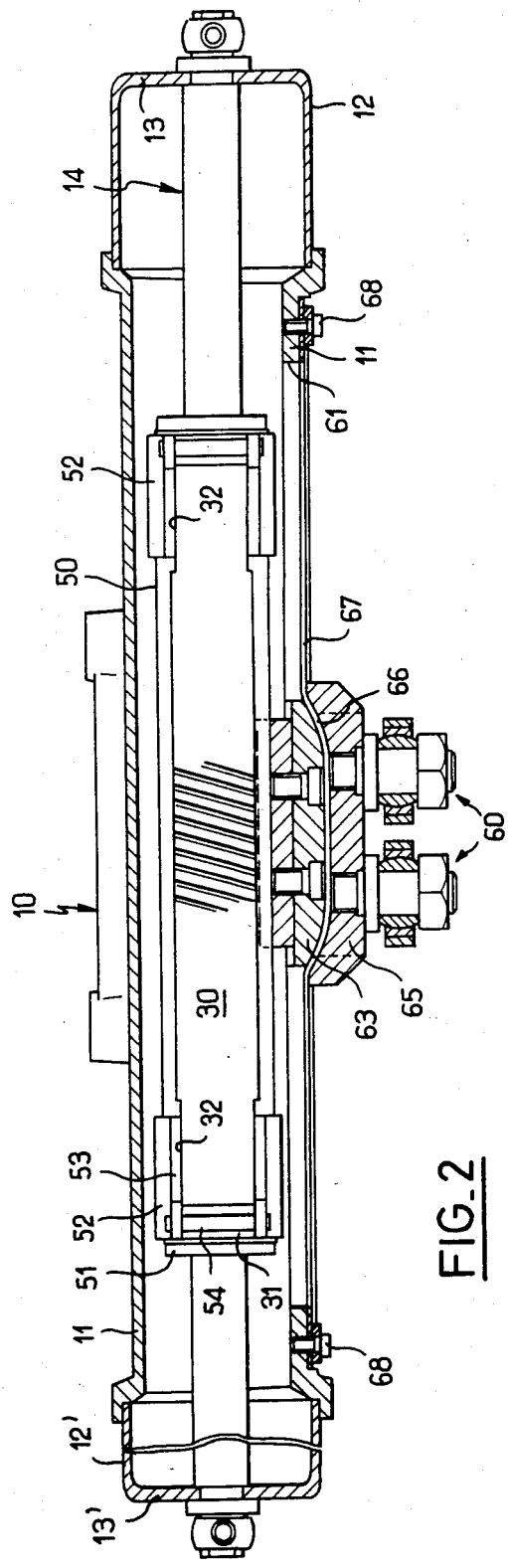
FIG_1
FIG_2

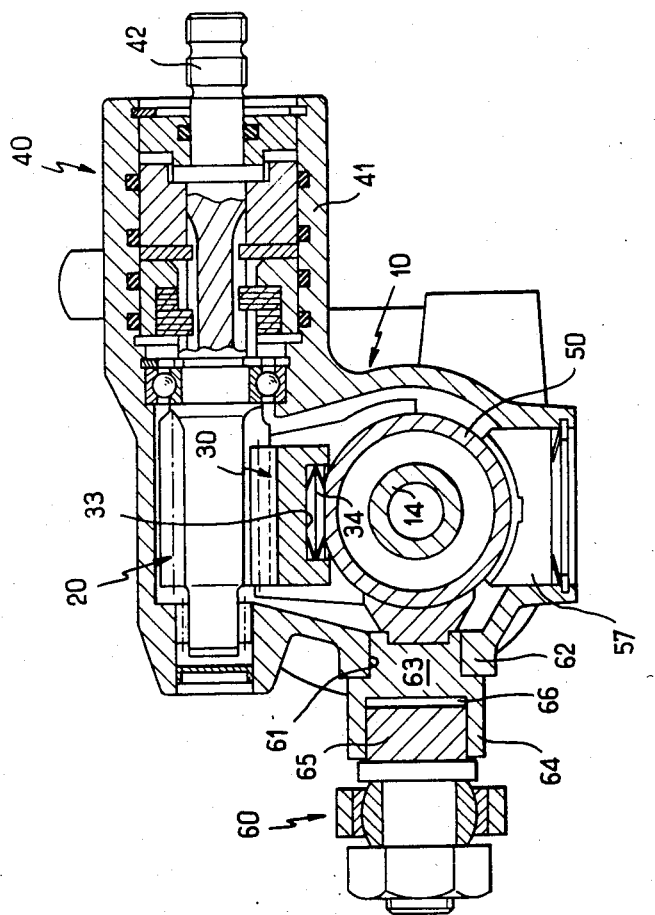
FIG_3
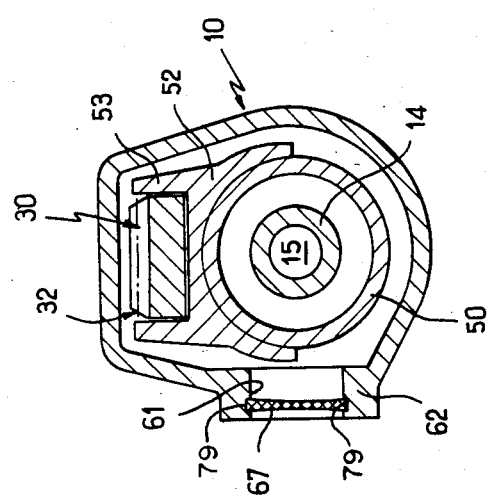
FIG_4

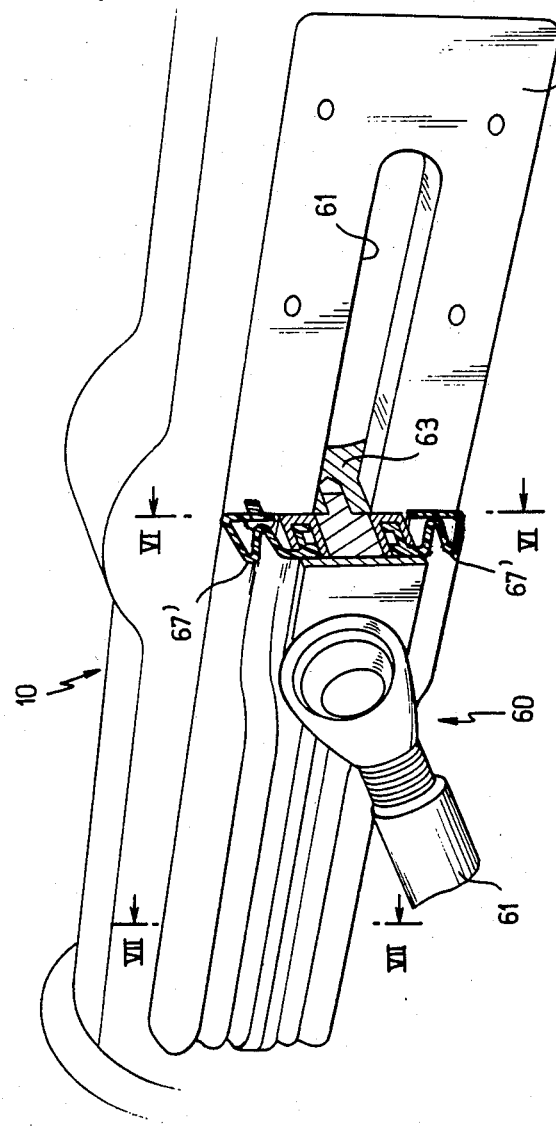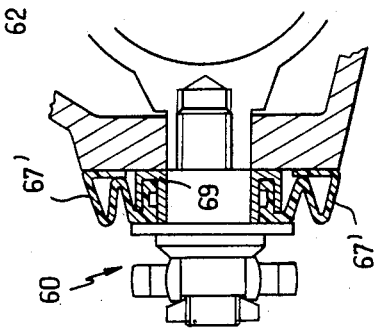

COMPACT ASSISTED STEERING MECHANISM FOR A MOTOR VEHICLE

The present invention concerns assisted steering mechanisms for a motor vehicle, and more particularly, an assisted steering mechanism of the type incorporating a fixed steering casing in which a cooperating assembly with a pinion and a rack is arranged, the pinion being intended to be joined to a component for controlling the input to the mechanism, an assistance assembly with fluid under pressure incorporating a fixed piston, firmly fixed to the casing by a hollow rod, and a movable cylinder coupled in an elastic manner with the rack and defining first and second pressure chambers on each side of the piston, and a distribution valve means capable of being actuated by the input control component so as to supply the said first and second chambers selectively with fluid under pressure via fluid passages arranged in the hollow rod.

A mechanism of this type is described in the document No. FR-A-2,357,413. In said document, in order to avoid problems of excessive axial length of the mechanisms with a movable piston at the end of the rack, a cooperating piston/cylinder assistance assembly is provided parallel with the fixed steering casing, outside the latter. However, this arrangement has the disadvantages of increasing the transverse dimensions of the mechanism, of increasing the weight of the latter, and of increasing the number of sliding zones to be protected. Moreover, in the document, the rack slides, by means of tubular bearings, in the fixed steering casing which must be accurately machined for this purpose, the junction between the rack and the movable assistance cylinder being arranged through the intermediary of these sliding bearings.

The aim of the present invention is to propose an assisted steering mechanism of the type mentioned above, of a particularly compact and robust configuration, of low manufacturing cost and allowing a casing which is not machined internally, and a simplified rack not requiring very accurate machining, to be used.

To achieve this, according to a characteristic of the invention, the casing has a general tubular configuration with opposite end walls, the hollow rod being situated in the casing between these end walls, the rack being elastically mounted on the movable cylinder also incorporated in the casing.

According to another characteristic of the invention, elastic supports are provided between the rack and the movable cylinder, the rack advantageously being held at its ends, on this movable cylinder, by arches firmly fixed to the movable cylinder.

Other characteristics and advantages of the present invention will emerge from the following description of embodiments, given by way of illustration but not limiting in any way, with reference to the accompanying drawings, in which:

FIG. 1 is a view in longitudinal section of a compact assisted steering mechanism according to the invention;

FIG. 2 is a diagrammatic view in longitudinal section through the line II—II shown in FIG. 1;

FIGS. 3 and 4 are views in transverse section through the lines III—III and IV—IV, respectively, shown in FIG. 1;

FIG. 5 is a partial perspective view of a variant of construction of the elastic means for closing the rectangular window of the steering casing; and FIGS. 6 and 7 are diagrammatic views in transverse section through the section lines VI—VI and VII—VII, respectively, shown in FIG. 5.

In the description which follows and in the drawings, identical or similar components carry the same reference numbers, possibly primed.

As shown in the drawings, the assisted steering mechanism according to the invention incorporates a steering casing, designated generally by the reference 10, intended to be fixed to a fixed portion of the chassis of a motor vehicle, and advantageously made as a casting. Arranged in the casing 10 is a cooperating assembly of a pinion 20, pivoting in the casing 10, and a rack 30 constructed in this case in the form of a flat rack block in the shape of a parallelepiped.

The steering casing 10 consists of a principal tubular body portion 11 to the open ends of which are attached ends in the shape of cups (12, 12') each incorporating a bottom (13, 13'), these bottoms forming the axially opposed end walls of the casing 10. A hollow rod 14 extends between these bottoms, incorporating ends which pass through the bottoms 13 and 13' so as to be sealed, by means of which the rod is fixed onto the bottoms 13 and 13' and to which are attached connectors 140, 140' for connecting to tubing for supplying fluid under pressure 141, 141'. An annular piston 16 is fixed centrally on the hollow rod 14 which incorporates, in line with the piston 16, a sealed separation bulkhead 17 dividing the internal conduit 15 of the hollow rod 14 into two portions opening outwards through the intermediary of radial passages 18 and 19, respectively, arranged each side of the piston 16. A cylinder assembly slides on the fixed piston 16 and the fixed rod 14, consisting of a tubular cylinder body 50, cooperating with the periphery of the piston 16, and two sliding end bearings 51 cooperating in sealed sliding with the periphery of the hollow rod 14, thus defining, on each side of the fixed piston 16, two actuating chambers 58 and 59 supplied through the passages 18 and 19.

The rack block 30 is floatingly mounted on the cylinder body 50 so as to be able to slightly tilt around the axis of the piston 20 or about an axis parallel to the piston rod 14 relative to a cylinder body 50. As is clearly seen in FIGS. 1 and 2, the rack body 30 incorporates ends 31 of reduced width and thickness each entering between the lateral walls of a portion forming a channel 53 of an arch 52 fixed onto the corresponding end of the cylinder body 50. As shown in FIG. 4, the axially opposed end zones of the rack body 30 incorporate curved lateral walls 32, with their convex surfaces facing outwards, while these ends terminate in fingers of reduced thickness which are immobilized by crossmembers 54 joining the walls facing one another 53 of the arch 52. The lower surface of the rack body 30, which is essentially flat, incorporates a certain number of cylindrical housings 33 which are axially distant from one another and in which are housed and positioned elastic components 34, through the intermediary of which the rack block 30 bears against the cylinder body 50. In the example shown, the elastic components each consist of a stack of elastic washers which may, as a variant, be replaced by blocks made of elastomer, possibly reinforced.

In accordance with a feature of the invention, connecting components 60 are firmly fixed to the cylinder body 50, these connecting components being intended for connection to linkages 61 for steering the steerable wheels of the vehicle and passing through, so as to guide and to slide, a rectangular window 61 arranged in a lateral wall 62 of the principal body portion 11 of the casing 10. The pinion 20 is joined, through the intermediary of a coupling with dead travel and of a distribution valve 40, advantageously housed in a tubular transverse extension 41 of the principal body portion 11 of the casing, to an input control shaft 42 for the mechanism intended to be joined to the steering wheel of the vehicle. The distribution valve 40 is, for example, of the type with a star-shaped type rotor (See U.S. Pat. No. 4,459,897) and a C-shaped spring described in copending U.S. application Ser. No. 698,735, its distribution ports being connected to tubing 141 and 141'.

It will be understood that with the arrangement described above, the floating transverse relationship between the rack body 30 and the cylinder body 50 avoids imperfections of the teeth of the rack resulting in stresses exerted on the sliding bearings 51 of the cylinder 50, and also conversely, owing to the "ball-joint" relationship between the ends of the rack block 30 and the channels 53 of the arches 52, possible angular movements of the cylinder 50 about its axis, resulting particularly from the imperfections of guidance between the connecting components 60 and the walls of the longitudinal window 61, are not transmitted to the toothed interface between the rack 30 and the pinion 20, in an arrangement thus largely limiting the stresses which are likely to appear in the active components of the mechanism. It will be noted that, in a conventional manner, the cylinder body 50 bears downwards against a profiled elastic support component 57 mounted in the principal body portion 11 of the casing 10 in line with the pinion 20 (and with the fixed piston 16).

In the embodiment shown in FIGS. 1 to 4, the connecting components 60 consist of an internal block 63 fixed to the cylinder body 50, entering the window 61 so as to slide and extending outwards as a portion in the shape of a fork 64 in which an external block 65 is fixed carrying the ball-joints for connecting to the links 61. As shown in FIG. 3, the two blocks 63 and 64 arrange between them a passage of rectangular section 66 with a profile which is progressively offset from the window 61 and through which a flexible sealing strip 67 is caused to pass when the blocks 63, 65 move relative to the casing 10. The sealing strip 67 is secured at longitudinal ends 68 to zones of the main body portion delimitating axially the elongate window 61, the longitudinal facing edges of window 61 formed with longitudinal grooves 79 within which the longitudinal edges of the strips 67 are releasably accommodated. In this way, as the connecting components 60 move, the strip 67, forced to pass through the passage 66, disengages from grooves 79 on one side so as to reoccupy its housing in these grooves downstream of the blocks 63 and 65.

In the embodiment shown in FIGS. 5 to 7, the internal block 63 of the connecting components 60 incorporates a component forming a slide 69 cooperating with the complementary ends of two covers with longitudinal undulations 67' so as to separate and remake progressively a joint 670 of the sliding closure type during movement of the connecting components 60 along the rectangular window 61, the covers 67' being fixed, at their opposite ends on each side of the window 61, to the lateral wall 62 of the principal body portion 11 of the casing 10.

I claim:

1. Assisted steering mechanism for a motor vehicle incorporating:

a fixed steering casing in which a cooperating assembly with a pinion and a rack is arranged, the pinion being intended to be joined to an input control component for controlling input to the mechanism;

an assistance assembly with fluid under pressure incorporating a fixed piston, firmly fixed to the casing by a hollow rod, and a movable cylinder coupled in an elastic manner with the rack and defining first and second pressure chambers on each side of the piston; and distribution valve means capable of being actuated by the input control component so as to supply the first and second chambers selectively with fluid under pressure via fluid passages arranged in the hollow rod;

characterized in that the casing has a general tubular configuration with opposite end walls, the hollow rod being situated in the casing between the end walls, the rack being elastically mounted on the movable cylinder and incorporated in the casing;

the mechanism including an elastic support between the rack and the movable cylinder;

the rack being held at its ends by arches firmly fixed to the movable cylinder; and each end of the rack including convex lateral walls and entering into a portion forming a channel of the arches.

2. Assisted steering mechanism for a motor vehicle incorporating:

a fixed steering casing in which a cooperating assembly with a pinion and a rack is arranged, the pinion being intended to be joined to an input control component for controlling input to the mechanism;

an assistance assembly with fluid under pressure incorporating a fixed piston, firmly fixed to the casing by a hollow rod, and a movable cylinder coupled in an elastic manner with the rack and defining first and second pressure chambers on each side of the piston; and distribution valve means capable of being actuated by the input control component so as to supply the first and second chambers selectively with fluid under pressure via fluid passages arranged in the hollow rod;

characterized in that the casing has a general tubular configuration with opposite end walls, the hollow rod being situated in the casing between the end walls, the rack being elastically mounted on the movable cylinder and incorporated in the casing;

the steering mechanism including connecting components for connection to linkages for the steerable wheels of the vehicle and firmly fixed to the movable cylinder and passing through, so as to guide and to slide, a rectangular window arranged in a lateral wall of the the casing;

the mechanism having elastic means for sealing the rectangular window; and the elastic means comprising a flexible strip housed in grooves of the window and passing through an external offset passage disposed in the connecting components.

3. Assisted steering mechanism for a motor vehicle incorporating:

a fixed steering casing in which a cooperating assembly with a pinion and a rack is arranged, the pinion being intended to be joined to an input control component for controlling input to the mechanism;

an assistance assembly with fluid under pressure incorporating a fixed piston, firmly fixed to the casing by a hollow rod, and a movable cylinder coupled in an elastic manner with the rack and defining first and second pressure chambers on each side of the piston; and distribution valve means capable of being actuated by the input control component so as to supply the first and second chambers selectively with fluid under pressure via fluid passages arranged in the hollow rod;

characterized in that the casing has a general tubular configuration with opposite end walls, the hollow rod being situated in the casing between the end walls, the rack being elastically mounted on the movable cylinder and incorporated in the casing;

the steering mechanism including connecting components for connection to linkages for the steerable wheels of the vehicle and firmly fixed to the movable cylinder and passing through, so as to guide and to slide, a rectangular window arranged in a lateral wall of the the casing;

the mechanism having elastic means for sealing the rectangular window; and the elastic means including two covers with longitudinal undulations joined centrally, so as to be capable of being separated by a joint of sliding closure type whose slide is formed by the connecting components.

4. A power assisted steering mechanism for a vehicle, comprising a substantially tubular stationary steering casing having opposite end walls and a lateral enclosing wall, a pinion journaled in said casing and in meshing engagement with a rack member in said casing, said pinion connected to an input shaft member, a stationary piston in said casing and fixedly connected to said end walls by a hollow rod extending between said end walls, a movable cylinder in said casing and enclosing said piston and defining opposite pressure chambers on both sides of said piston, distribution valve means operable by said input shaft member for selectively feeding a respective pressure chamber with a fluid pressure via fluid flow passages in said hollow rod, said rack member being resiliently supported on said cylinder and connected thereto for reciprocating displacement together with said cylinder, said cylinder carrying at least one output member for connection to a driven mechanism, said output member extending through an elongate window formed in said lateral enclosing wall.

5. The mechanism according to claim 4, wherein the mechanism includes elastic supports between the rack and the movable cylinder.

6. The mechanism according to claim 5, wherein the rack is held at its end by arches firmly fixed to the movable cylinder.

7. The mechanism according to claim 5 wherein the elastic supports comprise elastic components housed in cavities in the rack.

8. The mechanism according to claim 7, wherein the elastic components each comprise a stack of elastic washers.

9. The mechanism according to claim 4, wherein the mechanism includes elastic means for sealing the rectangular window.

* * * * *